United States Patent
Mans et al.

(10) Patent No.: US 10,083,640 B2
(45) Date of Patent: Sep. 25, 2018

(54) MULTI-LAYER DISPLAY INCLUDING PROXIMITY SENSOR AND DEPTH-CHANGING INTERFACE ELEMENTS, AND/OR ASSOCIATED METHODS

(71) Applicant: PURE DEPTH LIMITED, Auckland (NZ)

(72) Inventors: Richard N. Mans, Ngaruawahia (NZ); Sok-Mung Ng, Auckland (NZ)

(73) Assignee: PURE DEPTH LIMITED (NZ)

( * ) Notice: Subject to any disclaimer, the term of this patent is extended or adjusted under 35 U.S.C. 154(b) by 0 days.

(21) Appl. No.: 15/393,297

(22) Filed: Dec. 29, 2016

(65) Prior Publication Data
US 2018/0190168 A1    Jul. 5, 2018

(51) Int. Cl.
| | | |
|---|---|---|
| *G09G 5/00* | (2006.01) | |
| *G09G 3/00* | (2006.01) | |
| *G06F 3/0488* | (2013.01) | |
| *G06F 3/01* | (2006.01) | |
| *G06F 3/0484* | (2013.01) | |

(52) U.S. Cl.
CPC ............. *G09G 3/003* (2013.01); *G06F 3/017* (2013.01); *G06F 3/04883* (2013.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 7,626,594 | B1 * | 12/2009 | Witehira | G02B 27/2228 345/4 |
| 7,951,001 | B2 * | 5/2011 | Wells | G07F 17/3211 349/73 |
| 8,630,741 | B1 | 1/2014 | Matsuoka et al. | |
| 2003/0137469 | A1 | 7/2003 | Hansen et al. | |

(Continued)

FOREIGN PATENT DOCUMENTS

WO   WO 2015/042048   3/2015

OTHER PUBLICATIONS

U.S. Appl. No. 15/391,903, filed Dec. 28, 2016; O'Brien et al.

*Primary Examiner* — Jason Pringle-Parker
(74) *Attorney, Agent, or Firm* — Craig A. Baldwin

(57) ABSTRACT

Certain example embodiments relate to a system including a user-interactive display device having LCDs in substantially parallel spaced apart relation to one another. A proximity sensor is located proximate to the user-interactive display device. A controller is configured to perform instructions to perform functionality including: generating visual content, including one or more user interface elements (e.g., user-interactive elements), for output to the user-interactive display device; causing the user-interactive display device to display the generated visual content; receiving output from the proximity sensor; determining when an object of interest comes into proximity to the user-interactive display device, based on the received output from the proximity sensor; and responsive to a determination that the object of interest has come into proximity to the user-interactive display device, updating the generated visual content and causing the updated generated visual content to be displayed via the user-interactive display device.

14 Claims, 4 Drawing Sheets

(56) References Cited

U.S. PATENT DOCUMENTS

| | | | |
|---|---|---|---|
| 2007/0072665 A1* | 3/2007 | Muir | G07F 17/32 |
| | | | 463/12 |
| 2011/0054785 A1 | 3/2011 | Wood et al. | |
| 2011/0082620 A1* | 4/2011 | Small | B60K 35/00 |
| | | | 701/31.4 |
| 2011/0134066 A1 | 6/2011 | Blumenberg et al. | |
| 2011/0157040 A1 | 6/2011 | Kashio | |
| 2011/0164047 A1 | 7/2011 | Pance | |
| 2014/0062946 A1* | 3/2014 | Graumann | G02B 27/01 |
| | | | 345/174 |
| 2016/0012630 A1 | 1/2016 | Bell | |
| 2016/0049109 A1* | 2/2016 | Engel | G09G 3/36 |
| | | | 345/4 |
| 2016/0127775 A1 | 5/2016 | Zilberstein et al. | |

* cited by examiner

MULTI-LAYER DISPLAY INCLUDING PROXIMITY SENSOR AND DEPTH-CHANGING INTERFACE ELEMENTS, AND/OR ASSOCIATED METHODS

FIELD OF THE INVENTION

Certain example embodiments of this invention relate to an electronic device having an information display, and/or associated methods. More particularly, certain example embodiments of this invention relate to multi-focal plane information displays and a method of enhancing information extraction from same.

BACKGROUND AND SUMMARY

Electronic display technology for displaying graphical images and/or text has evolved dramatically to meet the pervasive user demand for more realistic and interactive displays. A wide range of display technologies with differing capabilities are now available. These display technologies include various types of flat panel display technologies such as, for example, plasma display panels (PDPs), liquid crystal display (LCD) devices, organic light-emitting diode (OLED) displays, and the like.

Yet most display technologies generally are only capable of displaying two-dimensional images on a single screen. The ability to form images at different depths within a display, whether real or perceived, has been the subject of ongoing research and development, e.g., in the quest to provide display technology capable of replicating or augmenting the depth effects conferred by normal human sight, providing more interesting and/or stimulating interactions with electronic displays, etc.

The manner in which human beings process visual information has been the subject of extensive and prolonged research in an attempt to understand this complex process. This research has included the effects of depth or "apparent depth" provided by volumetric, three-dimensional or multi-focal plane displays. And the term "preattentive processing" has been coined to denote the act of the subconscious mind in analyzing and processing visual information that has not become the focus of the viewer's conscious awareness.

When viewing a large number of visual elements, certain variations or properties in the visual characteristics of elements can lead to rapid detection by preattentive processing. This is significantly faster than requiring a user to individually scan each element, scrutinizing for the presence of the said properties. Exactly what properties lend themselves to preattentive processing has in itself been the subject of substantial research. Color, shape, three-dimensional visual clues, orientation, movement, and depth have all been investigated to discern the germane visual features that trigger effective preattentive processing.

It has been determined that the use of a plurality of depth/focal planes as a means of displaying information can enhance preattentive processing with enhanced reaction/assimilation times.

Three-dimensional or multi-focal plane displays are known to provide numerous advantages or capabilities unavailable with conventional two-dimensional displays. Examples of a three-dimensional and multi-focal plane displays include stereoscopic displays and Multi-Layer Displays (MLDs), respectively.

Known three-dimensional displays seek to provide binocular depth cues to the viewer through a variety of techniques including, for example, using separate head-mounted displays located directly in front of each eye, lenticular displays, holography, etc. Unfortunately, each of these possesses certain limitations. For example, head-mounted displays add ergonomic inconvenience, reduce the viewer's peripheral awareness and are often cumbersome and can cause nausea, headaches, and/or disorientation. Lenticular displays are most effective at oblique viewing angles and thus may not be useful in a broad array of different environments and for a number of different applications, and holography is currently limited in many respects.

Stereoscopic (and auto-stereoscopic) displays provide the appearance of a 3D image by providing slightly different visual images to the left and right eyes of the viewer to use the binocular capabilities of the human visual system. Stereoscopic displays have caught on in recent years.

MLD systems are multi-focal plane displays that use multiple layered screens or "display layers" aligned parallel with each other in a stacked arrangement with a physical separation between each screen. Each screen is capable of displaying images on a different focal plane and, thus, such MLD systems are often referred to as multi-focal plane displays. Thus, multiple images separated by a physical separation or "depth" can be displayed on one display. PCT Publication No. WO 99/142889, for example, discloses an MLD in which depth is created by displaying images on the background screen furthest from the viewer and that will appear at some depth behind images displayed on the screen(s) closer to the user. The benefits of MLDs, in particular those using the technology described in the published PCT Patent Publication Nos. WO 1999/042889 and WO 1999/044095, for example, are gaining increasingly widespread recognition and acceptance because of their enhanced capabilities compared to conventional single focal plane display (SLD) systems. The entire contents of each of the above-identified applications is hereby incorporated herein by reference.

MLDs may be implemented using LCD devices, although MLDs can also be formed using other display technologies. For example, an LCD front display layer may be layered in front of an OLED rear display layer, etc.

Although various techniques for making user interaction with MLDs have been presented, further improvements are still desirable. For example, it would be desirable to make further improvements to facilitate preattentive processing in a variety of contexts and applications where MLDs are used.

Certain example embodiments relate to these and/or other concerns. For example, certain example embodiments relate to a display system is provided. A user-interactive display device comprises a plurality of liquid crystal display (LCD) devices in substantially parallel spaced apart relation to one another. A proximity sensor is located proximate to the user-interactive display device. A non-transitory computer readable storage medium tangibly stores instructions relevant to operation of the user-interactive display device. A controller is configured to perform the instructions to perform functionality comprising: generating visual content, including one or more user interface elements, for output to the user-interactive display device; causing the user-interactive display device to display the generated visual content; receiving output from the proximity sensor; determining when an object of interest comes into proximity to the user-interactive display device, based on the received output from the proximity sensor; and responsive to a determination that the object of interest has come into proximity to the user-interactive display device, updating the generated visual content and causing the updated generated visual content to be displayed via the user-interactive display device.

In certain example embodiments of this invention, there is provided a method of operating a display system comprising a plurality of display devices in substantially parallel spaced apart and overlapping relation to one another, and a proximity sensor, the method comprising: determining when an object of interest comes into proximity to at least one of the display devices; and responsive to a determination that the object of interest has come into proximity to the at least one display device, updating the visual content being displayed by the display system in order to at least one of: (a) move at least one user interface element from a first display device to a second display device among the plurality of display devices in order to change a depth of the at least one user interface element so as to emphasize the at least one user interface element to a user; and (b) move at least one non-user-interface element from one display device to another display of the plurality of display devices and further from a user in order to emphasize at least one user interface element to a user.

In certain example embodiments, there is provided a non-transitory computer readable storage medium tangibly storing instructions that, when executed by a processor, perform functionality comprising: generating visual content, including one or more user interface elements, for output to a user-interactive display device that includes a plurality of liquid crystal display (LCD) devices in substantially parallel spaced apart relation to one another; causing the user-interactive display device to display the generated visual content; receiving output from a proximity sensor located proximate to the user-interactive display device; determining when an object of interest comes into proximity to the user-interactive display device, based on the received output from the proximity sensor; and responsive to a determination that the object of interest has come into proximity to the user-interactive display device, updating the generated visual content and causing the updated generated visual content to be displayed via the user-interactive display device.

In certain example embodiments, there is provided a method of controlling an application, the method comprising: generating visual content, including one or more user interface elements, for output to a user-interactive display device that includes a plurality of liquid crystal display (LCD) devices in substantially parallel spaced apart relation to one another; causing the user-interactive display device to display the generated visual content; receiving output from a proximity sensor located proximate to the user-interactive display device; determining when an object of interest comes into proximity to the user-interactive display device, based on the received output from the proximity sensor; and responsive to a determination that the object of interest has come into proximity to the user-interactive display device, updating the generated visual content and causing the updated generated visual content to be displayed via the user-interactive display device.

Methods for using and/or configuring these and/or other systems also are contemplated herein. Similarly, non-transitory computer readable storage media tangibly storing instructions that, when executed by a hardware processor, perform these and/or other methods also are contemplated herein.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to Multi-Layer Displays (MLDs), and/or methods of relating to their operation. More particularly, certain example embodiments provide improvements to user interfaces implemented in connection with MLDs.

Figure 1:
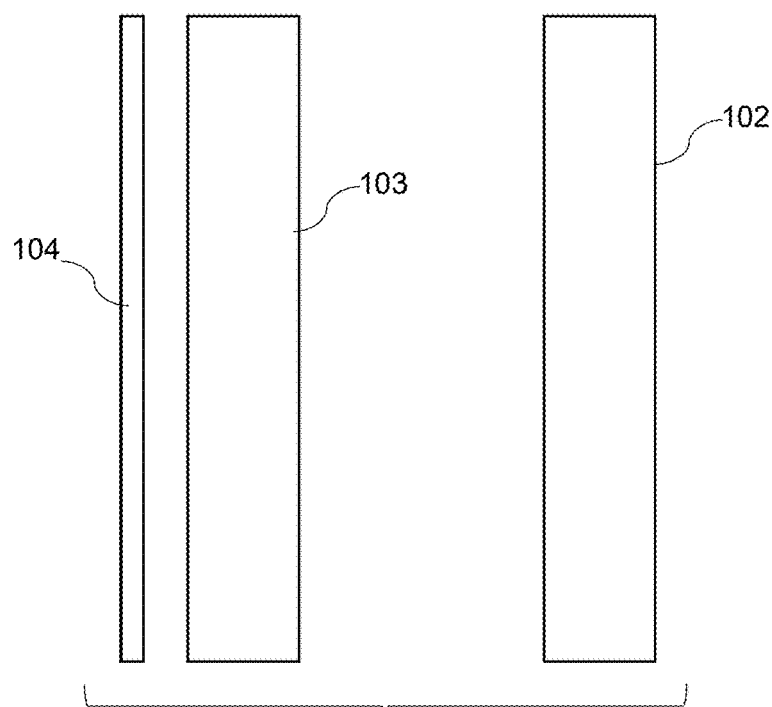
FIG. 1 is a schematic exploded cross-sectional view of a multi-layered display (MLD) in accordance with an example embodiment.
Figure 2:
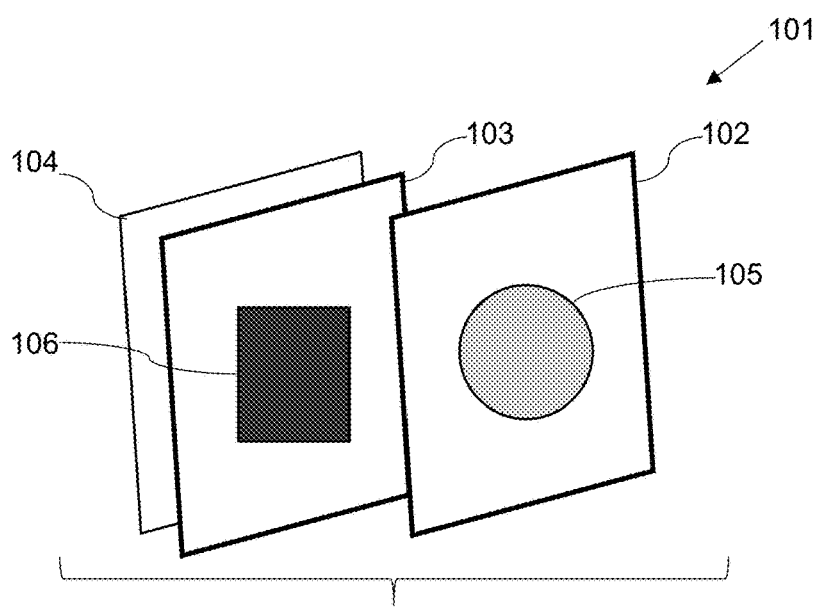
FIG. 2 is a schematic exploded perspective view of the example MLD of FIG. 1.

FIG. 1 is a schematic exploded cross-sectional view of an MLD in accordance with an example embodiment, and FIG. 2 is a schematic exploded perspective view of the example MLD of FIG. 1. The example MLD shown in FIGS. 1-2 includes first and second display layers provided in the form of front 102 and rear 103 LCD (or OLED) screens. The front and rear screens 102 and 103 are positioned, parallel to, but spaced apart from each other with the front screen 102 overlapping the rear screen 103. A backlight array 104 is provided behind the rear screen 103 and is operable to provide light to the LCD screens 102 and 103. As will be appreciated by those skilled in the art, each LCD screen 102/103 includes a respective plurality of pixels controllable to form images thereon. For example, the first screen 102 is operable to display a first image 105 using at least some of its pixels, and the second screen 103 is operable to display a second image 106 using some of its pixels. The first screen 102 overlaps the second screen 103 and thus can be considered a "front" screen, with the second screen being a "rear" screen.

A pixel, generally speaking, is the smallest resolvable area of an image, either on a screen or stored in memory. For example, each pixel in a monochrome image has its own brightness, from 0 for black to the maximum value (e.g. 255 for an eight-bit pixel) for white. In a color image, for example, each pixel has its own brightness and color, usually represented as a combination of red, green, and blue intensities.

It will be apparent that a number of alternative display technologies may be used in place of, or in addition to, one or more of the LCD screens 102 and 103. Furthermore, although FIG. 1 shows a single screen 102 in front of the rear screen 103 for the sake of clarity and convenience, any number of additional (at least partially transparent) display layers may be incorporated into a design. Such displays may aid in providing a three dimensional quality to the scene viewed by an observer, e.g., as described in PCT publication Nos. WO 1999/042889 and WO 1999/044095, incorporated by reference herein.

Figure 3:
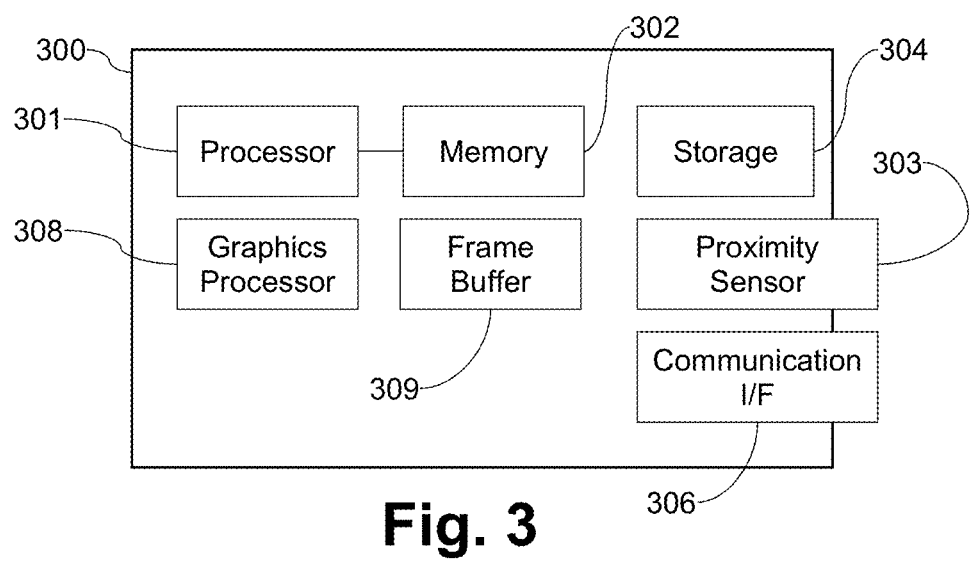
FIG. 3 is a block diagram showing structure for controlling an example MLD in accordance with certain example embodiments.

FIG. 3 is a block diagram showing structure for controlling an example MLD in accordance with certain example embodiments. It will be appreciated that the system 300 shown in FIG. 3 is provided by way of example and that a number of different systems including, but not limited to, embedded computer systems, vehicle dashboard display systems, portable and hand-held computer systems, mobile phones, and/or other electronic device types may be used to implement aspects of the example embodiments described herein. The system 300 includes at least one processor 301 that is operably coupled to the memory 302, e.g., via a data bus or the like. The at least one processor 301 and the memory 302 at least partially form processing resources of the system 300, and the at least one processor 301 may comprise a hardware processor (e.g., a central processing unit (CPU) or other type of processor). Depending on the configuration and/or type of computer system environment, the memory 302 may comprise volatile memory (e.g., RAM), non-volatile memory (e.g., ROM, flash memory, etc.), or some combination of the two. Additionally, memory 302 may be removable or non-removable in example embodiments. The computer system 300 may also have additional storage 304 (which may be removable, non-removable, and/or the like).

As shown in FIG. 3, the computer system 300 can communicate with other systems, components, and/or devices via a communication interface 306. Communication interface 306 may include computer-readable instructions, data structures, program modules, and/or other data in a modulated data signal (e.g., a carrier wave) or other transport mechanism, as well as hardware for sending and/or receiving the same. By way of example, the communication interface 306 may couple to and/or include wired media (e.g., a wired network, direct-wired connection, etc.) and/or wireless media (e.g., a wireless network, a wireless connection utilizing acoustic, RF, infrared, and/or other wireless signaling, etc.). Communication ports and/or connectors (e.g., to for a LIN bus, USB connection, etc.) also may be provided in certain example embodiments.

The communication interface 306 also couples the computer system 300 to one or more input devices (e.g., a keyboard, mouse, pen, voice input device, touch input device, etc.). Additionally, communication interface 306 may couple the computer system platform 300 to one or more output devices (e.g., a speaker, printer, etc.).

An optional graphics processor 308 may be provided and configured to receive image data to provide output to the MLD shown and described in connection with FIGS. 1-2. In this regard, data signals may be provided to the front and rear screens 102 and 103 to cause them to display the first and second images 105 and 106. The graphics processor 308 may perform graphics processing operations on graphical image data stored in a frame buffer 309 or another memory location (e.g., memory 302, storage 304, and/or the like) of the computer system platform 300. Graphical data stored in the frame buffer 309 may be accessed, processed, and/or modified by components (e.g., graphics processor 308, processor 301, and/or the like) of the computer system 300, and/or components of other systems/devices. It will be appreciated that the graphics processor 308 may include the frame buffer 309 in certain example embodiments. It also will be appreciated that the graphics processor 308 may be implemented as a GPU or other structure separate from the processor 301 in certain example embodiments. In other example embodiments, the graphics processor 308 may be collocated with, or implemented as a part of, the processor 301.

A proximity sensor 303 also may be provided as part of the system 300. The proximity sensor may be configured to detect an object of interest (e.g., a hand, finger, stylus, and/or the like) as it approaches an area of interest. For example, the proximity sensor 303 may detect a hand or finger approaching and/or interacting with the MLD, e.g., via touching, gestures, and/or the like. The proximity sensor 303 may incorporate known technology including, for example, infrared motion detectors, cameras, and/or the like. Location, gesture, and/or the like may be detected using known techniques. In certain example embodiments, a dedicated object (e.g., a stylus or the like) may be provided for the overall system 300, and the proximity sensor 303 may be configured to detect characteristics of it (e.g., emitted infrared or other energy, size/shape, etc.).

Accordingly, memory 302, storage 304, fame buffer 309, and/or a combination or sub-combination thereof, may comprise instructions that when executed by the processor 301 implement a method of generating images on the MLD of FIGS. 1-2, e.g., in accordance with a user interface and/or application hosted by and/or run on the computer system 300.

In certain example embodiments, some or all components of the computer system 300, the example MLD of FIGS. 1-2, and the proximity 303 may be located within a common housing. In certain example embodiments, a controller may comprise the components of the system 300 shown in FIG. 3, with the example MLD of FIGS. 1-2 being located remote therefrom. In certain example embodiments, each of the example MLD of FIGS. 1-2, the proximity sensor 303, and the remaining components of FIG. 3 may be provided in different housings.

From a human-computer interaction perspective, it oftentimes would be desirable to provide a simple uncluttered view of a user interface or application. This general design principle can aid in user experience for a variety of displays including MLDs, and designing for simplicity can be beneficial in a variety of contexts. For example, a simple and uncluttered user interface or application would be desirable in environments where quick viewer comprehension is sought after (e.g., driving an automobile). Similarly, when a viewer reaches out to interact with the display (e.g., using touch, gesture, and/or the like), it would be beneficial from a human-computer interaction perspective to make it apparent which part(s) of the underlying user interface or application are interactive, which option(s) for interaction are available, what information is active and/or believed to be important, etc.

Increasing the salience (highlighting) of a user interface (UI) element may aid in these and/or other regards. An element can be highlighted, for example, by any one or more of the following operations and/or other techniques: scaling elements (e.g., icons, buttons, etc.) so that they appear comparatively larger (e.g., by making the element(s) larger, by making other elements smaller, and/or the like); providing decorations, glows, accents, and/or the like, to yield a corresponding increase in brightness, saturation, size, and/or the like; causing text labels, icons, and/or other user interface elements to appear; adjusting color; adding borders; creating a gradual unfolding animation; producing an audible cue synchronized to a visual cue; etc. It oftentimes is seen as necessary to use more than one of these effects to help ensure that the selectability is sufficiently perceivable. Yet doing so unfortunately can lead to a disparate, cluttered, complicated, and/or otherwise undesirable user interface.

Figure 4:
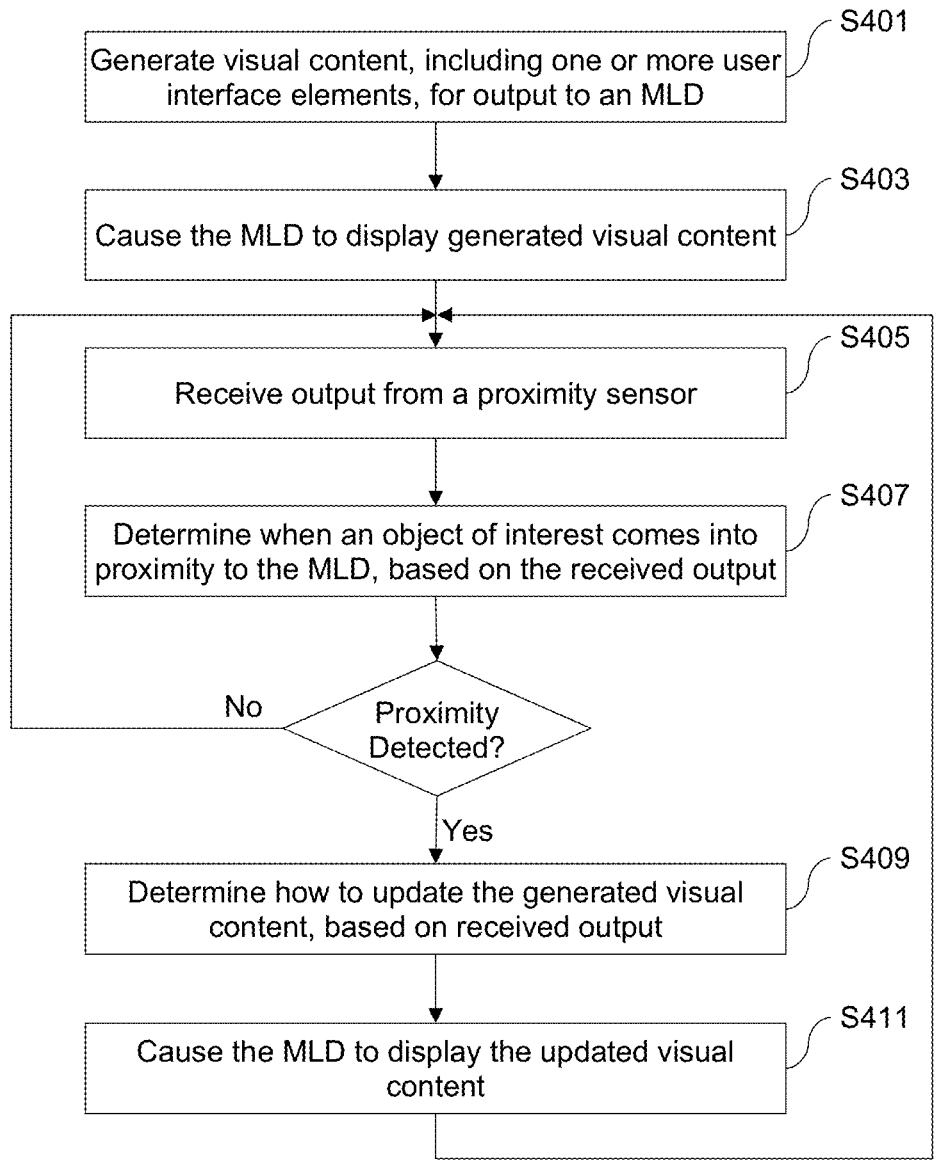
FIG. 4 is a flowchart showing an example method for enhancing the selectability of user interface elements in an example MLD user interface, in accordance with certain example embodiments.

Having an MLD presents additional opportunities for enhancing selectability, however. In addition to the above-described techniques for highlighting, it also is possible to use design an MLD user interface to make it seem that content is selectively and dynamically brought forward. FIG. 4 is a flowchart showing an example method for enhancing the selectability of user interface elements in an example MLD user interface, in accordance with certain example embodiments. As shown in step S401, visual content including one or more user interface elements is generated for output to an MLD (e.g., of the type described in connection with FIGS. 1-2). In step S403, the MLD is made to display the generated visual content (e.g., using the circuitry described in connection with FIG. 3). In step S405, output from a proximity sensor is received. This output may correspond to an object of interest coming into proximity to the MLD, e.g., as indicated in step S407. This includes, for example, potentially detecting touches, gesture controls, or simply an object passing into an area of interest. If there is no detection, the process simply returns to step S405 and awaits further input.

However, if proximity is detected, then in step S409, a determination is made as to how to update the generated visual content. This determination may be made based on the received output. For example, the distance from the delay, the location of the object relative to user interface elements that potentially are user-interactive, a detected gesture, etc., may be determined using the proximity sensor. Based on this and/or other data, a lookup may be made, and the update to the underlying content in the user interface or application may be determined. In step S411, the MLD is caused to display the updated visual content, and the process returns to step S405 to await further input (unless, for example, the device is powered down, etc.).

After the user moves the hand or other object away from the MLD, in certain example embodiments the display elements may be made to move to their original z-positions or depth levels by reversing the changes. This may help signify that the display is operating in a lower-powered mode, that it is not necessary or desirable to interact with elements, etc.

Figure 5:
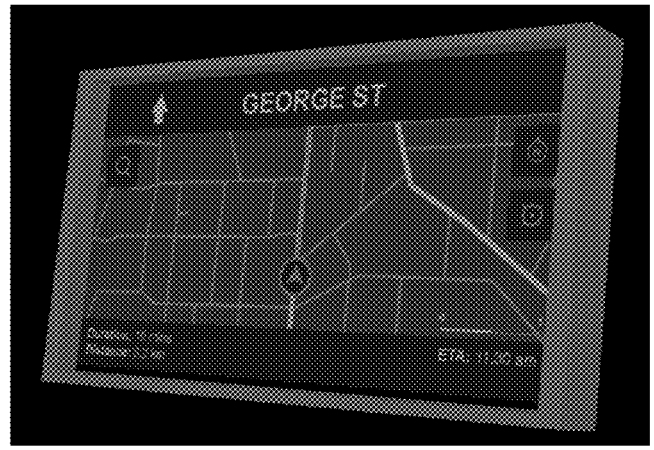
FIG. 5 is a first view of an example MLD showing an illustrative navigation-related user interface in which no user interface elements are highlighted, in accordance with certain example embodiments.
Figure 6:
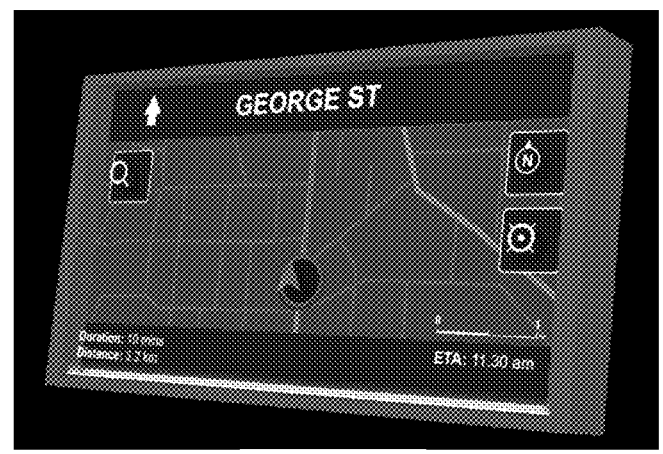
FIG. 6 is a second view of an example MLD showing the illustrative navigation-related user interface of FIG. 5, except that certain user interface elements are highlighted, in accordance with certain example embodiments.

FIGS. 5-6 provide a concrete example of how this might work. In this regard, FIG. 5 is a first view of an example MLD showing an illustrative navigation-related user interface in which no user interface elements are highlighted, in accordance with certain example embodiments; and FIG. 6 is a second view of an example MLD showing the illustrative navigation-related user interface of FIG. 5, except that certain user interface elements are highlighted, in accordance with certain example embodiments. The change from FIG. 5 to FIG. 6 may correspond to the shift from sleep mode or passive mode (e.g., in which a navigation application has been started but has transitioned to a lower-powered mode where elements are less emphasized) to active mode (where certain user interface elements are highlighted to aid in the user's understanding of the information being presented). As will be appreciated the display is uncluttered and simple to understand and use in both modes. Thus, when for example the proximity sensor detects a finger or the like approaching the display system, selectable buttons or areas may be highlighted or otherwise emphasized as shown in FIG. 6. An example way of emphasizing selectable buttons or areas upon detection of an incoming finger or the like would be to move selectable buttons or areas from the rear screen to the front screen, and/or to move non-selectable buttons or areas from the front screen to the rear screen.

As the user's hand approaches the MLD, the likelihood of user interface is increased and a potential interaction or actual interaction is detected. This causes certain elements to become highlighted or otherwise emphasized. For example, as can be seen by contrasting FIGS. 5-6, a white accent appears at the bottom of the display, buttons grow larger (see left/right edges of screen) and move to the front panel, text gets brighter and moves to front panel, etc. The other highlighted information includes a search button, compass information, a zoom to present location button, an indicator of the current location relative to the map and a planned route, information elements including scale, duration left to travel, distance left to travel, estimated time of arrival, next directional step information, etc. It will be appreciated that these are user interface elements and that some (but not necessarily all) will be user-interactive. It will be appreciated that these are all user-interface elements, although some are user-interactive user interface elements in that they invite interaction. The salience of this information is increased as the proximity sensor (which may be located in or near the screen as noted above) detects that the user is reaching out to interact with the display. It will be appreciated that this technique includes, among other things, increasing the salience of user interface elements by at least popping (and optionally fading) elements from the back layer to the front layer, e.g., to increase the likelihood that a user will be able to quickly determine that the user can interact with this information, that it is believed to be important, to show a change in state, etc.

The other affordances for increasing salience described above can create a potentially more disparate feel for the overall user interface. In contrast, MLD popping and/or fading advantageously can provide a more consistent and intuitive approach for denoting that selected element(s) has/have or should receive focus. Consistency can be increased because the MLD popping and/or fading approaches can be performed regardless of the color, texture, shape, or otherwise of the object in question. Intuitiveness can be increased because it is possible to make it seem like one's finger is a magnet drawing the content towards oneself in some instances. The information may be popped or pushed back by changing depth levels of information, e.g., such that the information appears on different displays and/or surfaces of different displays, to move information forward or backward.

In certain example embodiments, it is possible to have more than two displays. For example, on a three or more level MLD, the depth can be varied proportionally to the user's hand's distance from the display. This advantageously can provide a gradual real-time feedback while adding a tactile-like sense to the user experience.

More accurate detection of proximity can be used to enable localized maximization of UI elements, e.g. if the user's hand approaches towards the left side, then a left side menu or the like could change depth. A static cue for the options available here may be presented so the user has an idea of the interactions available here, as opposed to the right hand side of screen. In certain example embodiments, this interaction may be staged, e.g., so that the cue is presented first, then it pops up (e.g., based on increased proximity, duration of hover, etc.).

U.S. Publication No. 2011/0310121 and U.S. Pat. No. 8,711,058 disclose techniques relevant to MLDs that may be used in connection with certain example embodiments, and the entire disclosures of each of which are hereby incorporated herein by reference.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a display system is provided a user-interactive display device comprises a plurality of liquid crystal display (LCD) devices in substantially parallel spaced apart relation to one another. A proximity sensor is located proximate to the user-interactive display device. A non-transitory computer readable storage medium tangibly stores instructions relevant to operation of the user-interactive display device. A controller is configured to perform the instructions to perform functionality comprising: generating visual content, including one or more user interface elements, for output to the user-interactive display device; causing the user-interactive display device to display the generated visual content; receiving output from the proximity sensor; determining when an object of interest comes into proximity to the user-interactive display device, based on the received output from the proximity sensor; and responsive to a determination that the object of interest has come into proximity to the user-interactive display device, updating the generated visual content and causing the updated generated visual content to be displayed via the user-interactive display device.

In addition to the features of the previous paragraph, in certain example embodiments, the updated generated visual content may selectively highlight the user interface element(s).

In addition to the features of the previous paragraph, in certain example embodiments, the selectively highlighting may include a change to a displayed depth of the user interface element(s).

In addition to the features of either of the two previous paragraphs, in certain example embodiments, the displayed depth may be changed so that the selectively highlighted user interface element(s) appear(s) closer to an outermost surface of the user-interactive display device.

In addition to the features of any of the three previous paragraphs, in certain example embodiments, the displayed depth may be changed so that a non-highlighted portion of the generated visual content appears to move closer to innermost surface of the user-interactive display device.

In addition to the features of any of the four previous paragraphs, in certain example embodiments, the displayed depth may be changed so that the selectively highlighted user interface element(s) appear(s) closer and closer to an outermost surface of the user-interactive display device as the object of interest comes into proximity to the user-interactive display.

In addition to the features of any of the five previous paragraphs, in certain example embodiments, the displayed depth may be changed by causing the selectively highlighted user interface element(s) to be displayed on different LCD devices in the user-interactive display device.

In addition to the features of any of the seven previous paragraphs, in certain example embodiments, the generated visual content may correspond to an application.

In addition to the features of the previous paragraph, in certain example embodiments, the application may be a navigation application and a plurality of user interface elements may be provided for using the navigation application.

In addition to the features of any of the nine previous paragraphs, in certain example embodiments, movements of the object of interest may be detectable and correspond to gesture control (e.g., for an application).

In addition to the features of any of the 10 previous paragraphs, in certain example embodiments, the controller may include at least one hardware processor that shares a housing with the user-interactive display device.

In certain example embodiments, there may be provided a vehicle comprising a center console and the system of any of the previous 11 paragraphs, e.g., where the user-interactive display device is provided in the center console of the vehicle.

In certain example embodiments, there is provided a non-transitory computer readable storage medium tangibly storing instructions that, when executed by a processor, perform functionality comprising: generating visual content, including one or more user interface elements, for output to a user-interactive display device that includes a plurality of liquid crystal display (LCD) devices in substantially parallel spaced apart relation to one another; causing the user-interactive display device to display the generated visual content; receiving output from a proximity sensor located proximate to the user-interactive display device; determining when an object of interest comes into proximity to the user-interactive display device, based on the received output from the proximity sensor; and responsive to a determination that the object of interest has come into proximity to the user-interactive display device, updating the generated visual content and causing the updated generated visual content to be displayed via the user-interactive display device.

In addition to the features of the previous paragraph, in certain example embodiments, the updated generated visual content may selectively highlight the user interface element(s) by altering a displayed depth thereof.

In addition to the features of the previous paragraph, in certain example embodiments, the displayed depth may be changed so that the selectively highlighted user interface element(s) appear(s) closer to an outermost surface of the user-interactive display device.

In addition to the features of either of the two previous paragraphs, in certain example embodiments, the displayed depth may be changed so that the selectively highlighted user interface element(s) gradually appear(s) closer and closer to an outermost surface of the user-interactive display device as the object of interest comes closer and closer to the user-interactive display device.

In addition to the features of any of the three previous paragraphs, in certain example embodiments, the displayed depth may be changed by causing the selectively highlighted user interface element(s) to be displayed on different LCD devices in the user-interactive display device.

In addition to the features of any of the five previous paragraphs, in certain example embodiments, the generated visual content may correspond to an application.

In addition to the features of any of the six previous paragraphs, in certain example embodiments, touch and/or gesture control detectable by the proximity detector is usable to interact with the generated visual content (e.g., to control an application).

In certain example embodiments, there is provided a method of controlling an application, the method comprising: generating visual content, including one or more user interface elements, for output to a user-interactive display device that includes a plurality of liquid crystal display (LCD) devices in substantially parallel spaced apart relation to one another; causing the user-interactive display device to display the generated visual content; receiving output from a proximity sensor located proximate to the user-interactive display device; determining when an object of interest comes into proximity to the user-interactive display device, based on the received output from the proximity sensor; and responsive to a determination that the object of interest has come into proximity to the user-interactive display device, updating the generated visual content and causing the updated generated visual content to be displayed via the user-interactive display device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A display system, comprising:
   a user-interactive display device comprising a plurality of display devices in substantially parallel spaced apart and overlapping relation to one another, each of the display devices comprising a respective display panel;
   a proximity sensor located proximate to the user-interactive display device;
   a controller configured to:
      generate visual content, including one or more user interface elements, for output to the user-interactive display device;
      cause the user-interactive display device to display the generated visual content;
      receive output from the proximity sensor;
      determine when an object of interest comes into proximity to the user-interactive display device, based on the received output from the proximity sensor; and
      responsive to a determination that the object of interest has come into proximity to the user-interactive display device, update the generated visual content and cause the updated generated visual content to be displayed via the user-interactive display device by altering a displayed depth thereof, so that the displayed depth is changed so that selectively highlighted user interface element(s) gradually appear(s) closer and closer to an outermost surface of the user-interactive display as the object of interest comes closer and closer to the user-interactive display.

2. The system of claim 1, wherein the controller is configured so that updated generated visual content selectively highlights and/or otherwise emphasizes user interface element(s) compared to non-user-interface elements.

3. The system of claim 1, wherein the controller is configured so as to, in response to an object of interest detected as coming into proximity to the user-interactive display device, move at least one user interface element from a first display device to a second display device among the plurality of display devices in order to change a depth of the at least one user interface element.

4. The system of claim 1, wherein the display devices comprise respective liquid crystal display panels.

5. The system of claim 1, wherein the generated visual content corresponds to an application.

6. The system of claim 5, wherein the application is a navigation application and a plurality of user interface elements are provided for using the navigation application.

7. The system of claim 1, wherein the object of interest is a finger of a user.

8. A vehicle comprising a dash, wherein the display system of claim 1 is provided at the dash of the vehicle.

9. The system of claim 1, wherein the controller includes at least one hardware processor.

10. A method of operating a display system comprising a plurality of display devices in substantially parallel spaced apart and overlapping relation to one another, each of the display devices comprising a respective display panel, the method comprising:
    determining when an object of interest comes into proximity to at least one of the display devices; and
    responsive to a determination that the object of interest has come into proximity to the at least one display device, updating the visual content being displayed by the display system in order to at least one move at least one user interface element from a first display device to a second display device among the plurality of display devices in order to change a depth of the at least one user interface element so as to emphasize the at least one user interface element to a user;
    wherein the updating the visual content comprises selectively highlighting the user interface element by altering a displayed depth thereof, so that the displayed depth of the user interface element is changed so that the selectively highlighted user interface element gradually appears closer and closer to an outermost surface of the display system as the object of interest comes closer and closer to the at least one display device.

11. A non-transitory computer readable storage medium tangibly storing instructions that, when executed by a processor, perform functionality comprising:
    generating visual content, including one or more user interface elements, for output via a user-interactive display that includes a plurality of liquid crystal displays (LCDs) devices in substantially parallel spaced apart relation to one another;
    causing the user-interactive display to display the generated visual content;
    receiving output from a proximity sensor located proximate to the user-interactive display;
    determining when an object of interest comes into proximity to the user-interactive display, based on the received output from the proximity sensor;
    responsive to a determination that the object of interest has come into proximity to the user-interactive display, updating the generated visual content and causing the updated generated visual content to be displayed via the user-interactive display;
    wherein the updating the generated visual content comprises selectively highlighting the user interface element(s) by altering a displayed depth thereof, so that the displayed depth is changed so that the selectively highlighted user interface element(s) gradually appear(s) closer and closer to an outermost surface of the user-interactive display as the object of interest comes closer and closer to the user-interactive display.

12. The non-transitory computer readable storage medium of claim 11, wherein the displayed depth is changed by causing the selectively highlighted user interface element(s) to be displayed on different LCD panels in the user-interactive display.

13. The non-transitory computer readable storage medium of claim 11, wherein the generated visual content corresponds to an application.

14. The non-transitory computer readable storage medium of claim 11, wherein the application is controllable via touch and/or gesture control detectable by the proximity detector.

* * * * *